(No Model.)
F. TRUMP.
TEDDER CRANK.
No. 296,368. Patented Apr. 8, 1884.
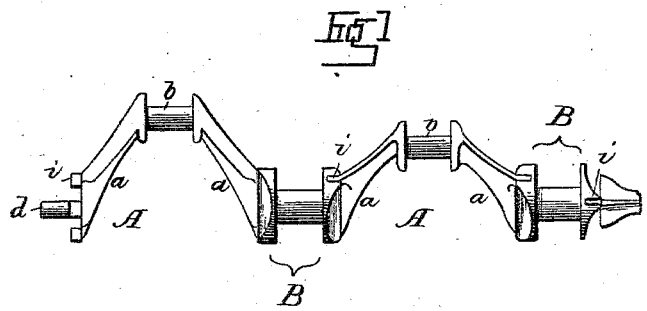
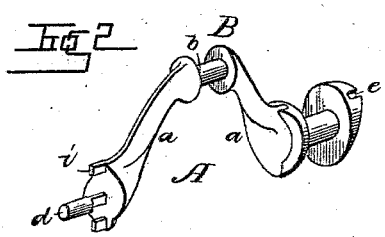
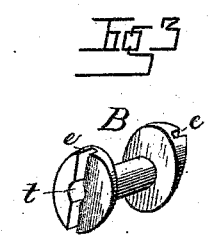
Witnesses:
John G. Hinkel
J. Campbell
Inventor:
Fuller Trump,
By Foster & Freeman
attys

UNITED STATES PATENT OFFICE.

FULLER TRUMP, OF SPRINGFIELD, OHIO.

TEDDER-CRANK.

SPECIFICATION forming part of Letters Patent No. 296,368, dated April 8, 1884.

Application filed November 20, 1883. (No model.)

*To all whom it may concern:*

Be it known that I, FULLER TRUMP, a citizen of the United States, and a resident of Springfield, Clark county, Ohio, have invented certain new and useful Improvements in Tedder-Cranks, of which the following is a specification.

My invention is a crank-shaft adapted for use where a series of cranks upon one shaft are required, but specially intended for use in hay-tedders.

In the drawings, Figure 1 is a view illustrating part of a crank-shaft having three cranks constructed in accordance with my invention. Fig. 2 is a detached perspective view, showing one of the cranks in connection, and Fig. 3 is a perspective view of one of the connecting-pieces.

In the manufacture of shafts having a number of cranks—such, for instance, as are used in hay-tedders—it is not only extremely difficult to make a solid shaft with all the parts between the cranks on the alignment, which parts usually constitute the bearings, but it is also difficult to repair if it becomes twisted or bent, while a very slight twist will result in great friction and loss of power and undue wear of the bearings. To overcome these objections I form each shaft having two or more cranks of separate sections consisting of crank-pieces A and connecting-pieces B. The crank-pieces are made of any suitable shape, so as to comprise the arms $a\ a$ and cross-pins $b$ of a double crank of the desired radius, and each connecting-piece B is adapted for attachment in any suitable manner to either of the arms $a$ at one end, and at the opposite end to either of the arms of another crank-piece, so that a series of crank-pieces and a series of connecting-pieces united constitute a shaft.

Any suitable means of connection may be adopted for detachably uniting the cranks and couplings. For instance, a pin, $d$, concentric with the axis of the shaft, may extend from the end of each arm $a$, or from each end of the coupling-piece B, and one or more slots or recesses, $e$, in the crank or coupling-piece is adapted to a corresponding projection, $i$, on the opposite piece, so that when the pins $d$ and projections $i$ are introduced into their respective openings, the couplings are not only held rigidly in line with the axis, but are connected positively with the crank-pieces, so that all parts of the shaft must turn together. While I thus secure a shaft which is as rigid in use as one made of a single piece, it is not open to the objections incident to the latter, as it may be readily built up to any desired length of cheaply-constructed sections, all the parts are brought into alignment by the mere act of putting them together, while injury to any one part can be repaired by removing the section and replacing it with a perfect piece.

When the coupling-pieces B are fitted to boxes so as to constitute the bearings of the shaft, they cannot be put out of the line by the bending of the cranks, as results when the latter and intermediate points are in one piece. When the cranks are all to be at the same side and in the same plane, the recesses or projections at one end of the coupling-piece are directly opposite those at the other end; but when the cranks are to radiate from the axis at different angles, the recesses or pins at the opposite ends of the coupling-pieces are set at different points.

I do not claim a shaft consisting of separate sections, as I am aware that a shaft has been made by bolting together separate wrist-pins, side pieces, and connections.

Without limiting myself to any special forms of cranks and couplings, I claim—

1. A crank-shaft consisting of two or more crank-pieces and intermediate coupling-pieces, constructed for connection to form a rigid shaft, and also to be readily separated, substantially as set forth.

2. The combination, in a crank-shaft, of crank-pieces and coupling-pieces, with corresponding recesses and projections upon the crank-arm or coupling-pieces, to permit the continuous connection of the parts without interfering with their ready detachment, substantially as set forth.

3. The combination of the crank-pieces and coupling-pieces, having corresponding recesses and projections, the coupling-pieces adapted to the bearings, substantially as specified.

4. The coupling-pieces adapted to unite adjacent crank-pieces, and with projections or recesses at opposite ends arranged at different angles, for the purpose set forth.

In testimony whereof I have signed my name to this specification in the presence of two subscribing witnesses.

FULLER TRUMP.

Witnesses:
J. M. BOOKWETH,
W. A. SCOTT.